US011623855B1

(12) United States Patent
Ip

(10) Patent No.: US 11,623,855 B1
(45) Date of Patent: Apr. 11, 2023

(54) AUTOMATIC LIQUID SUPPLY DEVICE

(71) Applicant: Howang Ip, HongKong (CN)

(72) Inventor: Howang Ip, HongKong (CN)

( * ) Notice: Subject to any disclaimer, the term of this patent is extended or adjusted under 35 U.S.C. 154(b) by 0 days.

(21) Appl. No.: 17/741,368

(22) Filed: May 10, 2022

(30) Foreign Application Priority Data

Nov. 10, 2021 (CN) ........................ 202122746774.7

(51) Int. Cl.
*A47J 31/00* (2006.01)
*B67D 1/00* (2006.01)
*B67D 1/07* (2006.01)
*B67D 1/08* (2006.01)
*B67D 1/12* (2006.01)

(52) U.S. Cl.
CPC ............ *B67D 1/0014* (2013.01); *B67D 1/07* (2013.01); *B67D 1/0888* (2013.01); *B67D 1/0895* (2013.01); *B67D 2001/0095* (2013.01); *B67D 2001/075* (2013.01); *B67D 2001/1259* (2013.01)

(58) Field of Classification Search
CPC ...... B67D 1/0014; B67D 1/07; B67D 1/0888; B67D 1/0895; B67D 2001/0095; B67D 2001/075; B67D 2001/1259
See application file for complete search history.

(56) References Cited

U.S. PATENT DOCUMENTS 6,170,386 B1 * 1/2001 Paul .................... A47J 36/2433 99/275
8,230,774 B1 * 7/2012 Hunte .................. A47J 31/401 426/433
9,782,033 B2 * 10/2017 Ameye ................. A23L 33/135
2004/0261625 A1 * 12/2004 Fowlkes .............. A47J 31/007 99/427
2006/0007781 A1 * 1/2006 Martin .................. B01F 35/881 366/274
2010/0275556 A1 * 11/2010 Michelli ................ B67B 3/202 53/506
2014/0114469 A1 * 4/2014 Givens ................ B67D 1/0041 222/23
2016/0039653 A1 * 2/2016 Jangbarwala ............ B67D 1/16 222/1

* cited by examiner

*Primary Examiner* — Bob Zadeh
(74) *Attorney, Agent, or Firm* — Georgi Korobanov

(57) ABSTRACT

An automatic liquid supply device is provided, which includes a chassis, a tray, a conveying mechanism, a driving mechanism, a feeding mechanism and a center console. The tray is provided in the chassis and is provided with a plurality of rows of grooves, and the grooves are used for placing the liquid-containing device. The conveying mechanism includes a conveying box and a plurality of nozzles, each of the nozzles is communicated with the conveying box, provided with a flow switch, and provided with an infrared sensor and a first non-contact liquid level sensor, and a second non-contact liquid level sensor is provided at the grooves. The driving mechanism is configured for drive the conveying box to move. The center console is provided with a controller which is respectively connected with the flow switch, the infrared sensor, the first non-contact liquid level sensor and the second non-contact liquid level sensor.

10 Claims, 3 Drawing Sheets

AUTOMATIC LIQUID SUPPLY DEVICE

CROSS-REFERENCE TO RELATED APPLICATIONS

This is a U.S. patent application which claims the priority and benefit of Chinese Patent Application Number 202122746774.7, filed on Nov. 10, 2021, the disclosure of which is incorporated herein by reference in its entirety.

TECHNICAL FIELD

The disclosure relates to a technical field of liquid pouring, in particular to an automatic liquid supply device.

BACKGROUND

Currently, in restaurants, KTV and other places, liquid is usually poured into water cups and beverage cups manually, which is inefficient; and it is easy for the liquid to be spilled out carelessly, which is very inconvenient.

SUMMARY

Embodiments of the disclosure aims to provide an automatic liquid supply device for which liquid is not easy to be spilled out.

Embodiments of the disclosure can be realized as follows.

An automatic liquid supply device is provided in an embodiment of this disclosure, which includes a chassis, a tray, a conveying mechanism, a driving mechanism, a feeding mechanism and a center console.

An upper wall of the chassis is provided with a feeding port and an inner wall of the chassis is provided with a convex support.

The tray is provided in the chassis and can be supported on the convex support, and the tray is provided with a plurality of rows of grooves, and each of the rows is provided with a plurality of grooves. The plurality of rows of grooves are arranged at intervals and along a width direction of the chassis, and the grooves are used for placing a liquid-containing device.

The conveying mechanism includes a conveying box and a plurality of nozzles, each of the plurality of nozzles corresponds to each groove in a row of grooves, each of the plurality of nozzles is communicated with the conveying box, is provided with a flow switch, and is provided with an infrared sensor and a first non-contact liquid level sensor, and a second non-contact liquid level sensor is provided at the groove, the infrared sensor is configured for monitoring whether there is a liquid-containing device in the groove, and the first non-contact liquid level sensor and the second non-contact liquid level sensor are configured for monitoring a liquid level of the liquid-containing device.

The driving mechanism is configured for driving the conveying box to move in the chassis.

The feeding mechanism is configured for supplying liquid to the conveying box.

The center console is provided with a controller which is respectively connected with the flow switch, the infrared sensor, the first non-contact liquid level sensor and the second non-contact liquid level sensor.

Further, the driving mechanism includes a driving motor, a gear and a guide rail which can be meshed with the gear. The guide rail is installed on two opposite sides of the conveying box and the guide rail extends along a width direction of the chassis. A sliding groove is defined inside the chassis. The guide rail has a first end and a second end along a width direction thereof. The first end is connected with an outer side wall of the conveying box, and the second end is slidably matched with the sliding groove. The driving motor is installed to the chassis, and a power output of the driving motor is coaxially connected with the gear, and the gear is meshed with the guide rail.

Further, both ends of the guide rail in an extending direction thereof are provided with a travel switch, and the travel switch is in signal connection with the controller.

Further, the feeding mechanism includes an adapter and a feeding assembly. The feeding assembly includes a water inlet pipe, a soft material layer wrapped on an outer wall of the water inlet pipe and a valve provided in the water inlet pipe. The water inlet pipe is movably placed at the feeding inlet. The adapter is installed inside the chassis, one end of the adapter is communicated with the conveying box through a hose, and the other end of the adapter is communicated with the feeding port.

Further, the groove is defined with a through hole, and the through hole runs through the tray along a thickness direction of the tray. The feeding mechanism further includes a feeding support plate, the feeding support plate is obliquely arranged proximate to the feeding port, a lateral distance between an end of the feeding support plate proximate to the chassis and an edge of the feeding port is L1, and a lateral distance between an end of the feeding support plate away from the chassis and the edge of the feeding port is L2, and L1 is less than L2.

Further, a surface of the feeding support plate is provided with a rubber layer.

Further, the automatic liquid supply device further includes a baffle. The baffle is installed inside the chassis and divides an interior of the chassis into a sewage treatment area and a pouring area. The baffle is arranged below the convex support. The baffle is funnel-shaped, and a bottom of the funnel-shaped baffle is provided with a liquid outlet which communicates the sewage treatment area with the pouring area.

Further, the chassis includes an outer shell and an inner shell spaced from each other and an installation space is formed between the outer shell and the inner shell. Two barriers are provided between the outer shell and the inner shell to divide the installation space into a first accommodating cavity and a second accommodating cavity. An ultrasonic cleaner is installed in the first accommodating cavity and clean water can be stored in the ultrasonic cleaner. A side wall of the chassis corresponding to the second accommodating cavity is provided with an access opening, and the access opening is provided with a shielding plate which is pivotally connected with the side wall of the chassis.

Further, the inner shell of the chassis is provided with a rotating shaft and a clamping member. The rotating shaft and the clamping member are arranged on two opposite sides at a top of the chassis, and the clamping member is provided with a bayonet, the rotating shaft is rotatably supported at the inner shell, and a soft crimping cover is wound on the rotating shaft, and an end of the soft crimping cover is provided with a hook, which can be fixed to the bayonet.

Further, the automatic liquid supply device is further provided with an ultraviolet sterilization lamp and an electric heating tube. The ultraviolet sterilization lamp is installed to the inner shell and positioned above the convex support; and the electric heating tube is installed to the inner shell, and the electric heating tube is installed both above and below the tray.

The automatic liquid supply device in embodiments of the disclosure provide advantages that:

The liquid such as beverage or water can be poured into the conveying box through the feeding mechanism. The grooves of the tray are used for placing the liquid-containing device. As the tray is provided with a plurality of rows of grooves, each of the rows is provided with a plurality of grooves, and the plurality of rows of grooves are arranged at intervals and along the width direction of the chassis, the driving mechanism can drive the conveying box to move in the chassis in the width direction of the chassis, and the conveying box is communicated with the nozzles, and each of the nozzles corresponds to each of a row of grooves, so that liquid can be poured into the liquid-containing devices on the tray through the nozzles. As each of the nozzles is provided with the infrared sensor, the infrared sensor is used to monitor whether there is a liquid-containing device in the groove. When the infrared sensor detects that there is a liquid-containing device in the groove, a signal is transmitted to the controller, and the controller controls the driving motor to stop operating. Because each of the nozzles is provided with the first non-contact liquid level sensor, and each of the grooves is provided with the second non-contact liquid level sensor, the first non-contact liquid level sensor and the second non-contact liquid level sensor located above and below the liquid-containing can operate jointly to detect the liquid level of the liquid-containing and transmit a liquid level signal to the controller, and the controller controls the flow switch of the nozzle to pour the liquid into the liquid-containing device according to the liquid level of the liquid-containing device, so that a certain amount of liquid can be pouring accurately and conveniently, and the liquid is not easy to be spilled out. When the liquid-containing device is poured with the liquid, the tray can be taken out, and then can be placed on the convex support after use or when the liquid needs to be re-poured.

BRIEF DESCRIPTION OF DRAWINGS

In order to illustrate technical schemes of embodiments of this disclosure more clearly, the following drawings used in the embodiments will be briefly introduced; it should be understood that the following drawings only show some embodiments of this application, therefore they should not be regarded as a limiting of the protection scope; and other related drawings can be obtained according to these ones without creative effort for ordinary skilled in the art.

Figure 1:
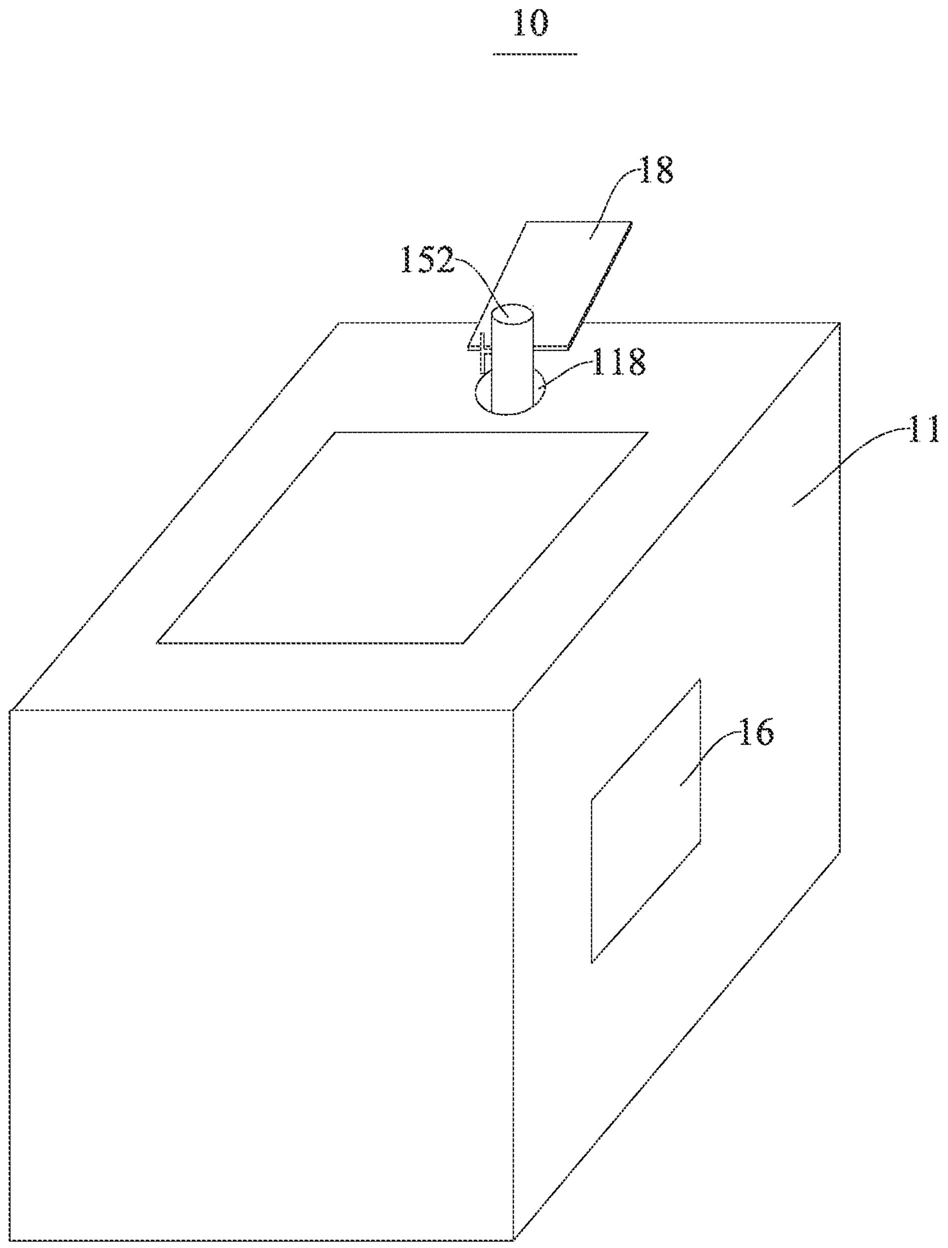
FIG. 1 is a structural schematic diagram of an automatic liquid supply device according to an embodiment of this disclosure.

Reference Number: 10—Automatic Liquid Supply Device; 11—Chassis; 110—Barrier; 111—Outer Shell; 112—Inner Shell; 113—First Accommodation Cavity, 114—Second Accommodation Cavity, 115—Ultrasonic Cleaner, 116—Access Opening; 117—Shielding Plate; 118—Feeding Port; 119—Convex Support; 12—Tray; 120—Handle; 121—Groove; 122—Through Hole; 13—Conveying Mechanism; 131—Conveying Box; 132—Nozzle; 14—Driving Mechanism; 141—Driving Motor, 142—Gear; 143—Guide Rail; 15—Feeding Mechanism; 151—Adapter; 152—Water Inlet Pipe; 153—Soft Material Layer; 154—Valve; 16—Center Console; 17—Baffle; 171—Liquid Outlet; 18—Feeding Support Plate; 191—Rotating Shaft; 192—Clamping Member; 1921—Bayonet; 193—Soft Crimping Cover, 1931—Hook; 194—Detergent Placing Box; 195—Detergent Placing Port.

DETAILED DESCRIPTION

In order to make the purposes, technical schemes and advantages of embodiments of this disclosure more clear, the technical schemes in the embodiments of this disclosure will be described clearly and completely with reference to the drawings in the embodiments of this disclosure; and it is Obvious that the described embodiments are part of the embodiments of this disclosure, but not all of them. The components of the embodiments of the application generally described and illustrated in the drawings herein can be arranged and designed in various different configurations.

Therefore, the following detailed description of the embodiments of the application provided in the drawings is not intended to limit the claimed scope of the application, but only shows selected embodiments of the application. On a basis of the embodiments in this application, all other embodiments obtained by the ordinary skilled in the art without any creative effort are within the protection scope of this application.

In the description of this application, it should be noted that the orientation or position relationships indicated by the terms such as “inner” and “outer” are based on the orientation or position relationships shown in the drawings, or the generally adopted orientation or position relationships when the products of this application are used are only for convenience of describing this application and for simplifying the description, but do not indicate or imply that the referred device or element must have a specific orientation, be constructed and operated in a specific orientation, and therefore cannot be understood as a limitation of this application. In addition, the terms “first”, “second”, etc. are only used to distinguish descriptions, and cannot be understood as indicating or implying a relative importance.

In the description of this application, it should also be noted that unless otherwise specified and limited, the terms “providing”, “installing” and “connecting” should be understood in a broad sense, for example, it can be “fixedly connecting”, or “detachably connecting” or “integrally connecting”, or it can be “mechanically connecting” or “electrically connecting”, or it can be “directly connecting” or “indirectly connecting through an intermediate medium”, or it can be “communicating within two elements”. For those ordinary skilled in the art, the specific meanings of the above terms in this application can be understood according to specific situations.

Figure 2:
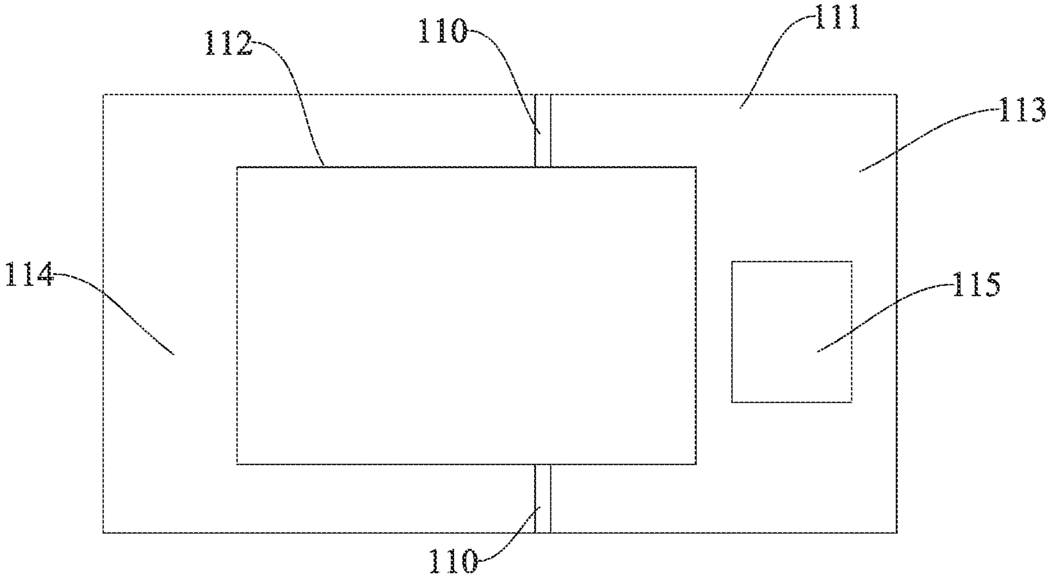
FIG. 2 is a structural schematic diagram of a chassis according to an embodiment of this disclosure.
Figure 3:
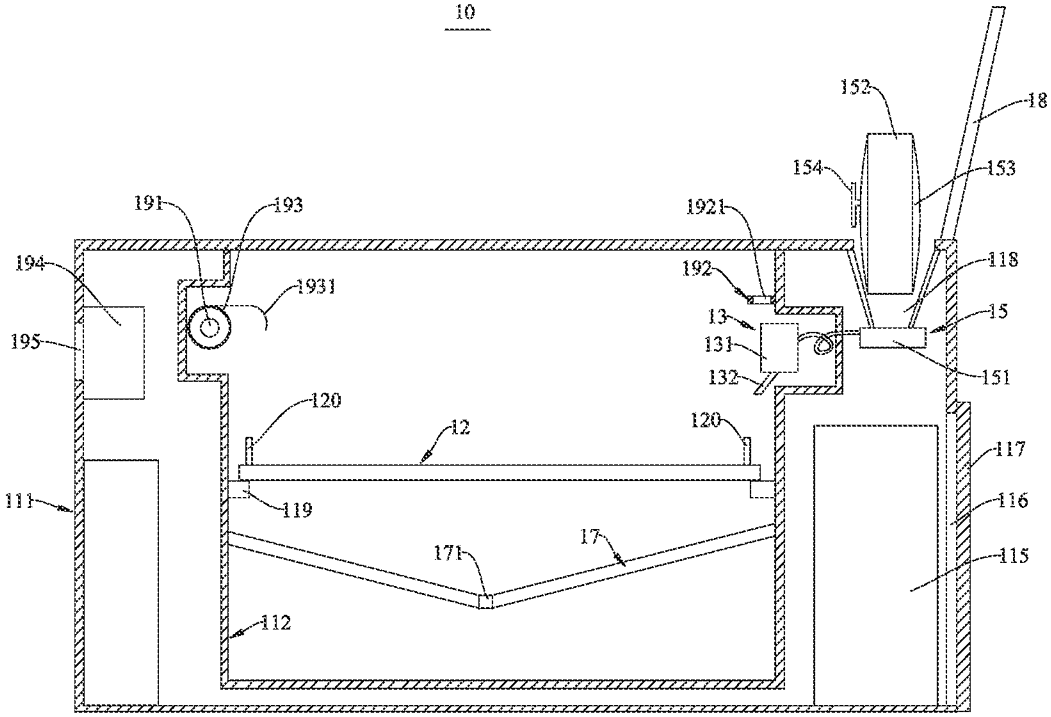
FIG. 3 is a sectional view of an automatic liquid supply device according to an embodiment of this disclosure.

An automatic liquid supply device 10 is provided in an embodiment of this disclosure, as referred to FIGS. 1-3, which includes a chassis 11, a tray 12, an ultraviolet sterilization lamp, an electric heating tube, a conveying mechanism 13, a driving mechanism 14, a feeding mechanism 15 and a center console 16.

The chassis 11 includes an outer shell 111 and an inner shell 112 spaced from each other and an installation space is formed between the outer shell 111 and the inner shell 112. Two barriers 110 are provided between the outer shell 111 and the inner shell 112 to divide the installation space into a first accommodating cavity 113 and a second accommodating cavity 114. An ultrasonic cleaner 115 is installed in the first accommodating cavity 113 and clean water can be stored in the ultrasonic cleaner 115. A side wall of the chassis 11 corresponding to the second accommodating cavity 114 is provided with an access opening 116, and the access opening 116 is provided with a shielding plate 117 which is pivotally connected with the side wall of the chassis 11. An upper wall of the chassis 11 is provided with a feeding port 118.

Since the ultrasonic cleaner 115 is installed in the first accommodating cavity 113 and the clean water can be stored in the ultrasonic cleaner 115, before pouring the liquid into a containing device, the containing device can be put into the ultrasonic cleaner 115 for cleaning, and after the cleaning, the containing device can be put into the grooves 121 of the tray 12 for liquid pouring. The access opening 116 is provided with the shielding plate 117, and the shielding plate 117 is pivotally connected with the side wall of the chassis 11. When the containing device needs to be cleaned, the shielding plate 117 is opened and the containing device is put into the ultrasonic cleaner 115. When it is not necessary to clean the containing device, the access opening 116 can be shielded by the shielding plate 117. In addition, the ultrasonic cleaner 115 can also be taken out from the access opening 116 for replacement of fresh water.

In a feasible embodiment, a detergent placing box 194 is installed in the second accommodating cavity 114, and the detergent placing box 194 has a detergent placing opening 195 at a position corresponding to the outer shell 111. Detergent can be placed in the detergent placing box 194, so that it can be used for washing when the containing device is washed.

The inner wall of the chassis 11 is provided with a convex support 119, and the tray 12 is provided in the chassis 11 and can be supported on the convex support 119, and the tray 12 is provided with a plurality of rows of grooves 121, and each of the rows is provided with a plurality of grooves 121. The plurality of rows of grooves 121 are arranged at intervals and along a width direction of the chassis 11, and the grooves 121 are used for placing a liquid-containing device.

The conveying mechanism 13 includes a conveying box 131 and a plurality of nozzles 132, each of the plurality of nozzles 132 corresponds to each groove 121 in a row of grooves 121, each of the plurality of nozzles 132 is communicated with the conveying box 131, is provided with a flow switch, and is provided with an infrared sensor and a first non-contact liquid level sensor, and a second non-contact liquid level sensor is provided at the groove 121, the infrared sensor is configured for monitoring whether there is a liquid-containing device in the groove 121, and the first non-contact liquid level sensor and the second non-contact liquid level sensor are configured for monitoring a liquid level of the liquid-containing device.

The driving mechanism 14 is configured to drive the conveying box 131 to move in the chassis 11 in a width direction of the chassis 11, and the feeding mechanism 15 is configured to supply liquid to the conveying box 131.

The center console 16 is installed to the side wall of the chassis 11 corresponding to the second accommodating cavity 114. The center console 16 is provided with a controller which is respectively connected with the flow switch, the infrared sensor, the first non-contact liquid level sensor and the second non-contact liquid level sensor.

The liquid such as beverage or water can be poured into the conveying box 131 through the feeding mechanism 15. The grooves 121 of the tray 12 are used for placing the liquid-containing device. As the tray 12 is provided with a plurality of rows of grooves 121, each of the rows is provided with a plurality of grooves 121, and the plurality of rows of grooves 121 are arranged at intervals and along the width direction of the chassis 11, the conveying box 131 is communicated with the nozzles 132, and each of the nozzles 132 correspond to each of a row of grooves 121. The driving mechanism 14 drives the conveying box 131 to move along the width direction of the chassis 11, so that liquid can be poured into the liquid-containing devices on the tray 12 through the nozzles 132. As each of the nozzles 132 is provided with the infrared sensor, the infrared sensor is used to monitor whether there is a liquid-containing device in the groove 121. When the infrared sensor detects that there is a liquid-containing device in the groove 121, a signal is transmitted to the controller, and the controller controls the driving motor 141 to stop operating. Because each of the nozzles 132 is provided with the first non-contact liquid level sensor, and each of the grooves 121 is provided with the second non-contact liquid level sensor, the first non-contact liquid level sensor and the second non-contact liquid level sensor located above and below the liquid-containing can operate jointly to detect the liquid level of the liquid-containing and transmit a liquid level signal to the controller, and the controller controls the flow switch of the nozzle 132 to pour the liquid into the liquid-containing device according to the liquid level of the liquid-containing device, so that a certain amount of liquid can be poured accurately and conveniently, and the liquid is not easy to be spilled out. When the liquid-containing device is poured with the liquid, the tray 12 can be taken out, and then can be placed on the convex support 119 after use or when the liquid needs to be re-poured. Illustratively, a handle 120 is installed at two opposite ends of the tray 12 to facilitate taking out and placing of the tray 12.

Figure 6:
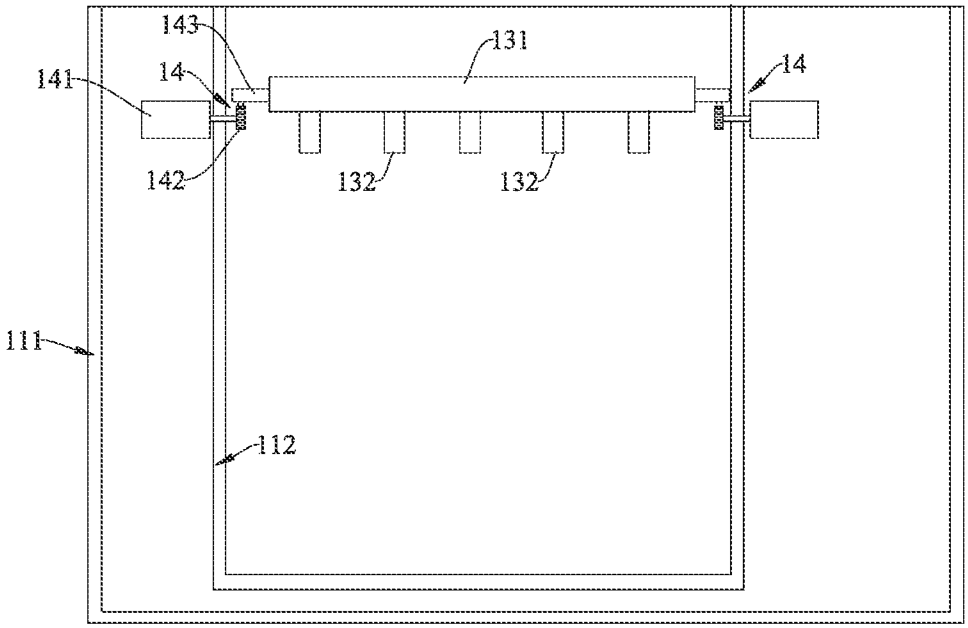
FIG. 6 is a schematic diagram of matching of a driving mechanism and a conveying mechanism according to an embodiment of this disclosure.

Referring to FIG. 6, the driving mechanism 14 includes a driving motor 141, a gear 142, and a guide rail 143 which can be meshed with the gear 142. The guide rail 143 is installed on two opposite sides of the conveying box 131, and the guide rail 143 is provided with teeth matched with the gear 142. The controller is in signal connection with the driving motor 141.

Further, the guide rail 143 extends along a width direction of the chassis 11. A sliding groove is defined inside the chassis 11 (not shown). The guide rail 143 has a first end and a second end along a width direction thereof. The first end is connected with an outer side wall of the conveying box 131, and the second end is slidably matched with the sliding groove. The driving motor 141 is installed to the chassis 11, and a power output of the driving motor 141 is coaxially connected with the gear 142, and the gear 142 is meshed with the guide rail 143.

The motor 141 can drive the gear 142 to rotate, the gear 142 can drive the guide rail 143 to move linearly, and the guide rail 143 can move to drive the conveying box 131 to move along the width direction of the chassis 11. The chassis 11 is internally provided with the sliding groove, and the second end of the guide rail 143 is slidably matched with the sliding groove, so that the sliding groove can support the conveying box 131 to a certain extent, and ensure smooth linear movement of the guide rail 143. Optionally, both ends of the guide rail 143 in an extending direction thereof are provided with a travel switch, and the travel switch is in signal connection with the controller. When the gear 142 contacts the travel switch, the travel switch transmits a signal to the controller, and the controller controls the driving motor 141 to reverse.

Figure 4:
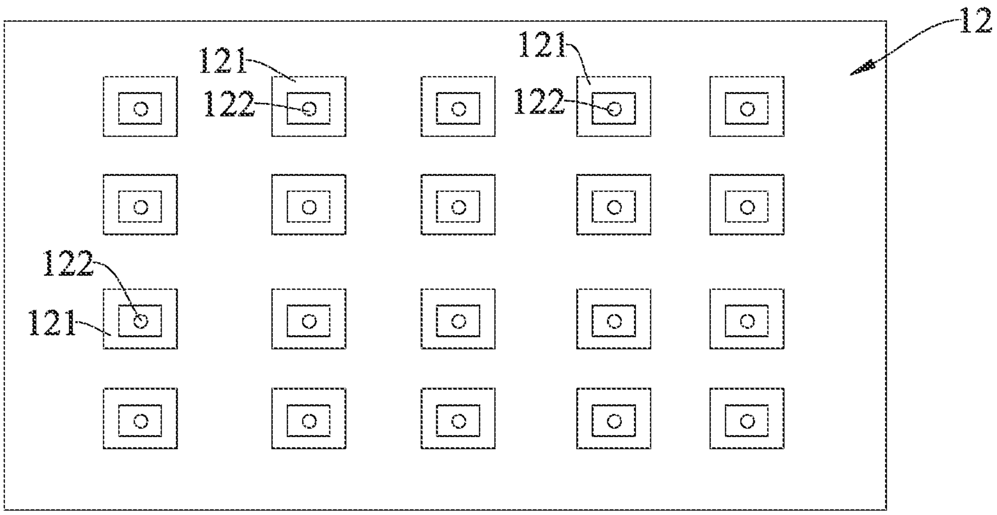
FIG. 4 is a structural diagram of a tray according to an embodiment of this disclosure.
Figure 5:
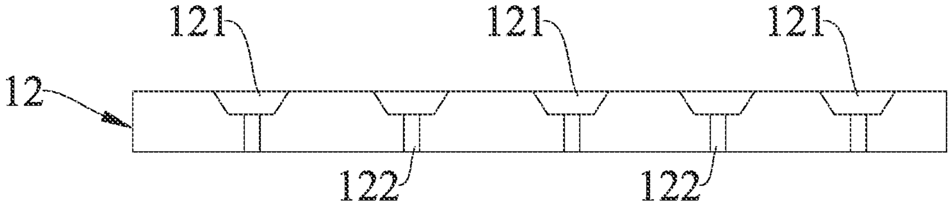
FIG. 5 is a structural diagram of a tray according to an embodiment of this disclosure.

For example, the groove 121 is defined with a through hole 122, and the through hole 122 runs through the tray 12 along a thickness direction of the tray 12 (see FIGS. 3 to 5).

Since the groove 121 of the tray 12 is provided with the through hole 122, if there is liquid on the outer wall of the containing device, it can flow to inside of the chassis 11 along the through hole 122.

In a feasible embodiment, the automatic liquid supply device 10 further includes a baffle 17. The baffle 17 is installed inside the chassis 11 and divides an interior of the chassis 11 into a sewage treatment area and a pouring area. The baffle 17 is arranged below the convex support 119. The baffle 17 is funnel-shaped, and a bottom of the funnel-shaped baffle 17 is provided with a liquid outlet 171 which communicates the sewage treatment area with the pouring area.

Since the baffle 17 is funnel-shaped and the bottom of the baffle 17 is provided with the liquid outlet 171, the liquid flowing down from the through hole 122 of each of the grooves 121 can drop onto the baffle 17, and the funnel-shaped baffle 17 collects the liquid into the liquid outlet 171 and then the liquid flows from the liquid outlet 171 to the sewage treatment area.

Further, the automatic liquid supply device 10 is further provided with an ultraviolet sterilization lamp and an electric heating tube. The ultraviolet sterilization lamp is installed to the inner shell 112 and positioned above the convex support 119; and the electric heating tube is installed to the inner shell 112, and the electric heating tube is installed both above and below the tray 12.

With the electric heating tube inside the chassis 11 and the electric heating tube being installed above and below the tray 12, the electric heating tube below the tray 12 can dry the liquid flowing down from the through hole 122, and the electric heating tube above the tray 12 can bake before and after the liquid pouring. In addition, the chassis 11 is internally provided with the ultraviolet sterilization lamp, which can carry out ultraviolet sterilization and is more sanitary to use.

The feeding mechanism 15 includes an adapter 151 and a feeding assembly. The feeding assembly includes a water inlet pipe 152, a soft material layer 153 wrapped on an outer wall of the water inlet pipe 152 and a valve 154 provided in the water inlet pipe 152. The water inlet pipe 152 is movably placed at the feeding inlet 118. The adapter 151 is installed inside the chassis 11, one end of the adapter 151 is communicated with the conveying box 131 through a hose, and the other end of the adapter 151 is communicated with the feeding port 118.

With the feeding mechanism 15, liquid such as beverage or water can be poured into the conveying box 131. When the liquid needs to be poured into the conveying box 131, the feeding assembly is taken out from the feeding port 118, and one end of the water inlet pipe 152 is inserted into a bottle containing the liquid from a bottle mouth. Because the outer wall of the water inlet pipe 152 has a soft material layer 153, the soft material layer 153 can seal the bottle mouth well, thus preventing the liquid from leaking out when entering the water inlet pipe 152. The water inlet pipe 152 has the valve 154, and the liquid in the bottle can be controlled to flow into the water inlet pipe 152 by opening or closing the valve 154. When the valve 154 is in a closed state, the other end of the water inlet pipe 152 inserted into the bottle can be placed at the feeding port 118, and then the valve 154 is opened, so that the liquid in the bottle flows to the feeding port 118 through the water inlet pipe 152. Since one end of the adapter 151 is connected with the conveying box 131 through a hose, and the other end of the adapter 151 is connected with the feed port 118, the liquid can flow into the conveying box 131 from the feed port 118 through the adapter 151, so that enough liquid can be stored in the conveying box 131.

Optionally, a thickness of the soft material layer 153 at both ends of the water inlet pipe 152 is smaller than that at a middle of the water inlet pipe 152. This can facilitate insertion of the water inlet pipe 152 into the bottle, and the soft material layer 153 in the middle of the water inlet pipe 152 can seal the bottle mouth at the same time. For example, the soft material layer 153 is made of rubber.

Further, the feeding mechanism 15 further includes a feeding support plate 18, the feeding support plate 18 is obliquely arranged proximate to the feeding port 118, a lateral distance between an end of the feeding support plate 18 proximate to the chassis 11 and an edge of the feeding port 118 is L1, and a lateral distance between an end of the feeding support plate 18 away from the chassis 11 and the edge of the feeding port 118 is L2, and L1 is less than L2.

When the liquid in the bottle is poured into the conveying box 131, the feeding support plate 18 can support the bottle to a certain extent, thus reducing probability of liquid spilling. Illustratively, a surface of the feed support plate 18 is provided with a rubber layer, which can increase friction with the bottle and have better supporting stability. Optionally, a surface of the rubber layer is provided with anti-sliding embosses, which can support the bottle more stably.

Further, the inner shell 112 of the chassis 11 is provided with a rotating shaft 191 and a clamping member 192. The rotating shaft 191 and the clamping member 192 are arranged on two opposite sides at a top of the chassis 11, and the clamping member 192 is provided with a bayonet 1921; the rotating shaft 191 is rotatably supported at the inner shell 112, and a soft crimping cover 193 is wound on the rotating shaft 191, and an end of the soft crimping cover 193 is provided with a hook 1931, which can be fixed to the bayonet 1921.

When a top of the chassis 11 needs to be shielded, the hook 1931 can be hooked to the bayonet 1921. When the top of the chassis 11 needs to be opened, the hook 1931 is separated from the bayonet 1921, and the soft crimping cover 193 is wound around the rotating shaft 191.

The above is only preferred embodiments of this application, and is not intended to limit this application, and modifications and variations can be made in this application for those skilled in the art. Any modification, equivalent substitution, improvement, etc. made within the spirit and principle of this disclosure shall be encompassed within the protection scope of this disclosure.

What is claimed is:

1. An automatic liquid supply device, comprising:

a chassis, an upper wall of which is provided with a feeding port and an inner wall of which is provided with a convex support;

a tray which is provided in the chassis and can be supported on the convex support, the tray being provided with a plurality of rows of grooves, and each of the rows being provided with a plurality of grooves, the plurality of rows of grooves being arranged at intervals and along a width direction of the chassis, and the plurality of grooves being used for placing a liquid-containing device;

a conveying mechanism comprising a conveying box and a plurality of nozzles, each of the plurality of nozzles corresponding to each groove in a row of the plurality of grooves, said each of the plurality of nozzles being communicated with the conveying box, being provided with a flow switch, and being provided with an infrared sensor and a first non-contact liquid level sensor, and a second non-contact liquid level sensor being provided at each of the plurality of grooves, the infrared sensor being configured for monitoring whether the a liquid-containing device is in each of the plurality of grooves, and the first non-contact liquid level sensor and the second non-contact liquid level sensor being configured for monitoring a liquid level of the liquid-containing device;

a driving mechanism configured for driving the conveying box to move in the chassis;

a feeding mechanism configured for supplying liquid to the conveying box; and a center console provided with a controller which is respectively connected with the flow switch, the infrared sensor, the first non-contact liquid level sensor and the second non-contact liquid level sensor.

2. The automatic liquid supply device according to claim 1, wherein the driving mechanism comprises a driving motor, a gear and a guide rail which can be meshed with the gear, the guide rail being installed on two opposite sides of the conveying box and the guide rail extending along a width direction of the chassis, a sliding groove being defined inside the chassis, the guide rail having a first end and a second end along a width direction thereof, the first end being connected with an outer side wall of the conveying box, and the second end being slidably matched with the sliding groove; the driving motor being installed to the chassis, and a power output of the driving motor being coaxially connected with the gear, and the gear being meshed with the guide rail.

3. The automatic liquid supply device according to claim 2, wherein both ends of the guide rail in an extending direction thereof are provided with a travel switch, and the travel switch is in signal connection with the controller.

4. The automatic liquid supply device according to claim 1, wherein the feeding mechanism comprises an adapter and a feeding assembly, the feeding assembly comprising a water inlet pipe, a soft material layer wrapped on an outer wall of the water inlet pipe and a valve provided in the water inlet pipe, the water inlet pipe being movably placed at the feeding inlet, the adapter being installed inside the chassis, one end of the adapter being communicated with the conveying box through a hose, and the other end of the adapter being communicated with the feeding port.

5. The automatic liquid supply device according to claim 1, wherein each of the plurality of grooves is defined with a through hole, and the through hole runs through the tray along a thickness direction of the tray; and the feeding mechanism further comprises a feeding support plate, the feeding support plate being obliquely arranged proximate to the feeding port, a lateral distance between an end of the feeding support plate proximate to the chassis and an edge of the feeding port being L1, and a lateral distance between an end of the feeding support plate away from the chassis and the edge of the feeding port being L2, and L1 being less than L2.

6. The automatic liquid supply device according to claim 5, wherein a surface of the feeding support plate is provided with a rubber layer.

7. The automatic liquid supply device according to claim 1, wherein the automatic liquid supply device further comprises a baffle, the baffle being installed inside the chassis and dividing an interior of the chassis into a sewage treatment area and a pouring area, the baffle being arranged below the convex support; the baffle being funnel-shaped, and a bottom of the funnel-shaped baffle being provided with a liquid outlet which communicates the sewage treatment area with the pouring area.

8. The automatic liquid supply device according to claim 1, wherein the chassis comprises an outer shell and an inner shell spaced from each other, an installation space being formed between the outer shell and the inner shell, two barriers being provided between the outer shell and the inner shell to divide the installation space into a first accommodating cavity and a second accommodating cavity, an ultrasonic cleaner being installed in the first accommodating cavity and clean water being stored in the ultrasonic cleaner, a side wall of the chassis corresponding to the second accommodating cavity being provided with an access opening, and the access opening being provided with a shielding plate which is pivotally connected with the side wall of the chassis.

9. The automatic liquid supply device according to claim 8, wherein the inner shell of the chassis is provided with a rotating shaft and a clamping member, the rotating shaft and the clamping member being arranged on two opposite sides at a top of the chassis, and the clamping member being provided with a bayonet; the rotating shaft being rotatably supported at the inner shell, and a soft crimping cover being wound on the rotating shaft, and an end of the soft crimping cover being provided with a hook, which is fixed to the bayonet.

10. The automatic liquid supply device according to claim 8, wherein the automatic liquid supply device is further provided with an ultraviolet sterilization lamp and an electric heating tube, the ultraviolet sterilization lamp being installed to the inner shell and positioned above the convex support; and the electric heating tube being installed to the inner shell, and the electric heating tube being installed both above and below the tray.

* * * * *